United States Patent
Pelletier et al.

(10) Patent No.: US 12,158,379 B1
(45) Date of Patent: Dec. 3, 2024

(54) SENSORS FOR SYSTEMS FOR MEASURING INERTIAL HEAT FLUX

(71) Applicant: OFFICE NATIONAL D'ETUDES ET DE RECHERCHES AÉROSPATIALES, Palaiseau (FR)

(72) Inventors: Nicolas Pelletier, Palaiseau (FR); Christophe Corato, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 0 days.

(21) Appl. No.: 18/833,180

(22) PCT Filed: Jan. 30, 2023

(86) PCT No.: PCT/EP2023/052160
§ 371 (c)(1),
(2) Date: Jul. 25, 2024

(87) PCT Pub. No.: WO2023/156178
PCT Pub. Date: Aug. 24, 2023

(30) Foreign Application Priority Data

Feb. 17, 2022 (FR) ...................... 2201419

(51) Int. Cl.
*G01K 17/00* (2006.01)
*G01K 7/04* (2006.01)
*G01N 25/22* (2006.01)

(52) U.S. Cl.
CPC .............. *G01K 17/00* (2013.01); *G01K 7/04* (2013.01); *G01N 25/22* (2013.01)

(58) Field of Classification Search
CPC ........... G01K 7/04; G01K 17/00; G01N 25/00
See application file for complete search history.

(56) References Cited

U.S. PATENT DOCUMENTS

| | | | |
|---|---|---|---|
| 6,186,661 B1 * | 2/2001 | Hevey | G01K 17/20 374/21 |
| 9,909,936 B2 | 3/2018 | Moriwaki et al. | |
| 2003/0198276 A1 | 10/2003 | Lee et al. | |

FOREIGN PATENT DOCUMENTS

| | | | |
|---|---|---|---|
| EP | 3106852 A1 * | 12/2016 | ............. G01K 17/00 |
| FR | 2706610 A1 | 12/1994 | |

OTHER PUBLICATIONS

Translation of FR2706610A1.*

(Continued)

*Primary Examiner* — Mirellys Jagan
(74) *Attorney, Agent, or Firm* — HAUPTMAN HAM, LLP (57) ABSTRACT

A sensor for a system for measuring inertial heat flux includes a solid calorimetric element having a thermal conductivity of greater than or equal to approximately 100 W/(m·K) and an electrical conductivity of greater than or equal to approximately $10^5$ S/m; a thermal insulation element partially covering said calorimetric element so as to define a first planar portion which is not covered by the calorimetric element and is configured to be exposed to the heat flux contained in the front face, and a second portion of the calorimetric element being thermally insulated from said heat flux. The sensor includes two wire-based conductive elements which pass through said calorimetric element and are arranged not to be in mechanical contact with one another but to be in electrical contact via said calorimetric element, the two wire-based conductive elements being made of two different thermoelectric materials.

17 Claims, 8 Drawing Sheets

(56) References Cited

OTHER PUBLICATIONS

International Search Report and Written Opinion issued in corresponding International Application No. PCT/EP2023/052160, mailed May 4, 2023, European Patent Office, Rijswijk, Netherlands, pp. 1-7.

* cited by examiner

SENSORS FOR SYSTEMS FOR MEASURING INERTIAL HEAT FLUX

The present application is a U.S. National Phase of International Application Number PCT/EP2023/052160, filed Jan. 30, 2023, which claims priority to French Application No. 2201419, filed Feb. 17, 2022.

TECHNICAL FIELD OF THE INVENTION

The present description relates to sensors for inertial heat flux measurement systems, systems comprising said sensors and methods for measuring a heat flux by means of said systems.

PRIOR ART

Heat flux measurement finds applications in many fields. In the field of microelectronics, for example, an accurate measurement of the dissipated heat fluxes allows optimising the architecture of the devices comprising semiconductors and increasing the energy efficiency thereof.

In the field of hydraulics, complex processes comprising turbulent flows, supercritical fluid flows or phase transitions such as boiling, can have their operation optimised thanks to the characterisation of the heat fluxes in action. This also allows correcting the models used in a standard manner, which are not very suitable for complex processes.

In the aerospace field, structures such as the combustion chambers of turbomachines or rocket engines, the atmospheric re-entry bodies or even the launch sites of launchers, are subjected to strong heat fluxes. Thus, it is often necessary to accurately know said heat fluxes in order to size the thermomechanical strength of the structures and to avoid any failure.

In the field of energy production and transformation processes (chemistry, steel industry, fluidised beds, etc.), the operating point of the plant is intimately related to the definition of a stable thermal equilibrium which requires a continuous control of the heat fluxes in action.

The measurement of heat flux is generally carried out indirectly based on a measurement of a quantity other than the flux, in particular the temperature of an element subjected to the heat flux to be measured. This element may be a portion of a larger system, for example a metal wall of a reactor, or a filler material.

Among sensors used to perform an indirect measurement of heat flux, it is in particular known to use an enthalpy fluxmeter, whose principle is based on a measurement of the rise in temperature of a liquid circulating throughout the body of the fluxmeter.

The measured temperature rise, at a given flow rate, allows having access to the thermal power absorbed by the liquid and obtaining the desired heat flux. In general, these devices give inaccurate results.

It is also known to use Gardon gauges, Schmidt-Boelter gauges and thermopiles, which perform an indirect measurement of heat flux through a measurement of a temperature difference in a solid medium comprised in the gauge. Preferably, this type of sensor is used to measure radiative heat fluxes, i.e. heat fluxes created by an electromagnetic radiation, and has proved its limitations when it comes to measure convective or mixed heat fluxes.

Another example of a remarkable device for measuring the heat fluxes indirectly is the inertial fluxmeter, wherein a heat flux is determined from a measurement of the rise in temperature of a reference element, so-called the calorimetric element, when said calorimetric element is exposed to the heat flux.

Figure 1:
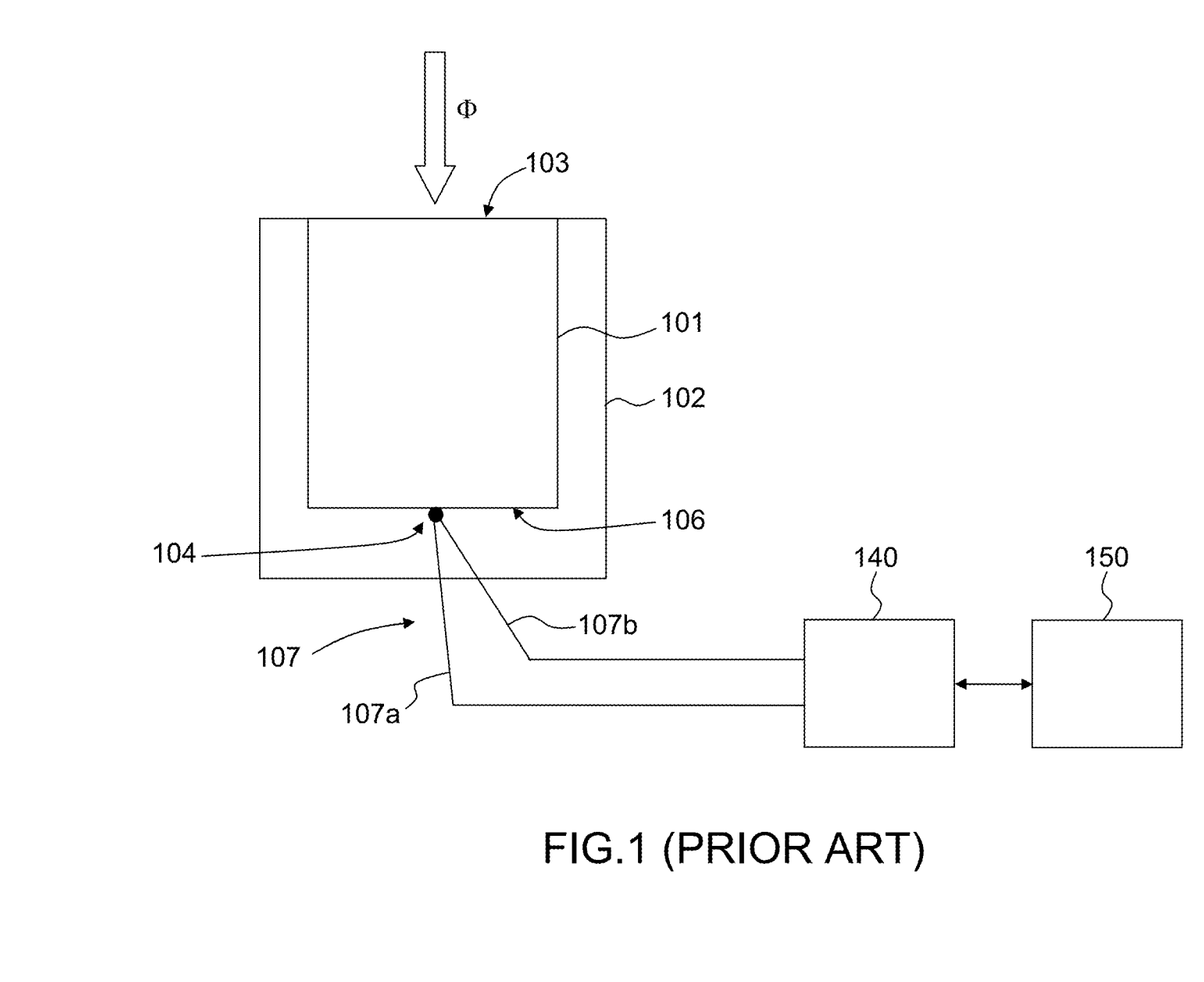
FIG. 1, already described, shows a diagram illustrating a heat flux measurement system comprising an inertial fluxmeter according to the prior art.

FIG. 1 illustrates an inertial fluxmeter of the prior art as disclosed, for example, by WO02/18890 A2 [Ref. 1] or JAYAPRAKASH, C., et al. [Ref. 2]. Such an inertial fluxmeter generally comprises a calorimetric element 101 and an insulation element 102 partially wrapping said calorimetric element 101. A face of the calorimetric element 101 not covered by the insulation element 102, so-called the front face 103, is configured to receive a heat flux. The fluxmeter further comprises a thermocouple 107 for determining the temperature of the calorimetric element 101 subjected to the heat flux. The thermocouple 107 comprises two wire-based elements 107a, 107b composed of two conductive materials having different Seebeck coefficients, said two wire-based elements 107a, 107b being connected at one single hot junction 104 at which the temperature of the calorimetric element 101 is measured. The hot junction 104 is in contact with a face of the fluxmeter opposite to the front face 103, so-called the rear face 106.

It is known that a potential difference substantially proportional to the temperature difference existing between the temperature at the hot junction 104 and a reference temperature at two cold junctions generally located at the ends of the wire-based elements 107a, 107b, appears between the two wire-based elements 107a, 107b. the apparition of such a potential difference is so-called the Seebeck effect.

Thus, by measuring said potential difference by means of a measurement unit 140, it is possible to deduce an increase in the temperature of the rear face 106 over time. Thus, from said temperature rise, a processing unit 150 can calculate the heat flux using the thermodynamics theory and the known properties of the calorimetric element 101, like the mass and the constant-pressure thermal capacity. However, the calculation of the heat flux $\phi$ is based on the assumption of a thin calorimetric element 101 so that the temperature measurement on the rear face 106 could be considered to be substantially equal to a temperature measurement on the front face 103.

The published patent application FR 2 706 610 [Ref. 3] also describes a sensor for a heat flux measurement system; the sensor described in [Ref. 3] comprises two conductors forming a thermocouple, and fastened at different points of a rear face of a sheet made of a conductive material and with a reduced thickness, typically smaller than one tenth of a millimetre.

Hence, a device as described in [Ref. 1], [Ref. 2] or [Ref. 3] does not allow accurately determining strong heat fluxes, i.e. heat fluxes higher than or equal to a few MW/m$^2$.

Indeed, in the presence of high heat fluxes, the calorimetric element 101 should be robust enough so as not to melt down during the measurement period, which is generally solved by increasing the dimensions of the calorimetric element 101.

However, the increase in the dimensions of the calorimetric element 101 results in an increase in the distance between the front face 103 exposed to the heat flux and the rear face 106 at which the temperature measurement is made. Thus, the assumption of a thin calorimetric element 101 is generally no longer met and the accuracy of the temperature measurement is considerably degraded, as well as the accuracy of the heat flux calculated from said temperature.

Hence, there is a need for sensors for inertial heat flux measurement systems enabling an accurate measurement of high heat fluxes, for example heat fluxes higher than or equal to a few MW/m².

SUMMARY OF THE INVENTION

In the present description, the term "comprise" has the same meaning as "include" or "contain", and is inclusive or open and does not exclude other elements that are not described or illustrated.

Furthermore, in the present description, the term "about" or "substantially" is synonymous with (has the same meaning as) a lower and/or upper margin of 10%, for example 5%, of the respective value.

According to a first aspect, the present description relates to a sensor for an inertial heat flux measurement system comprising:
- a solid calorimetric element with a given length, comprising a front face and a rear face opposite to the front face, said calorimetric element having a thermal conductivity higher than or equal to about 100 W/(m. K), preferably higher than or equal to about 300 W/(m. K), and an electrical conductivity higher than or equal to about $10^5$ S/m, preferably higher than or equal to about $10^7$ S/m;
- a thermal insulation element partially covering said calorimetric element so as to define a first portion not covered with the calorimetric element, substantially planar, configured to be exposed to a heat flux to be measured and forming part of said front face, and a second portion covered with the calorimetric element thermally insulated from said heat flux; and
- two wire-based conductive elements crossing said calorimetric element, from the rear face, at least partially and arranged so as not to be in mechanical contact with each other but to be in electrical contact via said calorimetric element over at least one portion of the length of the calorimetric element, the two wire-based conductive elements being made in two different thermoelectric materials.

In the present description, a thermoelectric material is a material whose electrical conductivity varies with temperature. In particular, such a material has an ability to convert a thermal energy into electrical energy, said ability being quantified by a Seebeck coefficient.

In the present description, two different materials are materials having distinct chemical compositions, advantageously different Seebeck coefficients. The Seebeck coefficients of most materials are known and accessible to a person skilled in the art in reference tables. Moreover, the measurement of the Seebeck coefficients may be performed by methods known from the prior art, including a method consisting in measuring the potential difference appearing between an element made of a material to be characterised and an element serving as a reference, for example platinum, when these two elements are brought into mechanical contact and subjected to a known temperature.

The Applicant has demonstrated that the original arrangement of the two thermoelectric materials as described in the sensor according to the first aspect allows measuring a heat flux more accurately than in the prior art, in particular when it consists of a heat flux higher than or equal to a few MW/m².

According to one or more example(s) of the description, it is advantageous to use two thermoelectric materials having Seebeck coefficients the difference between which is, in absolute value, higher than or equal to about 5 µV/K in order to be able to measure the temperature of the calorimetric element with the sensor according to the present description. In particular, the use of two thermoelectric materials having Seebeck coefficients the difference between which is, in absolute value, higher than or equal to about 5 µV/K allows obtaining a sensor with enough resolution for measuring the temperature of the calorimetric element.

In the present description, the length of the calorimetric element is defined between the front face and the rear face, according to a direction substantially normal to the first portion exposed to the heat flux.

A heat flux, expressed in W/m², measured at said first portion of the calorimetric element, is caused at a given time point by a temperature difference between the temperature of the environment outside the sensor at that time point and the temperature of the first portion of the calorimetric element at this time point. Because of this heat flux, the temperature of the calorimetric element increases over time.

In general, the heat flux comprises a radiative contribution, also so-called the radiative flux, and/or a convective contribution, also so-called the convective flux.

The radiative flux is due to the electromagnetic radiation between the environment outside the sensor and the first portion exposed to the heat flux. The convective flow is due to the movements of material in the environment outside the sensor at the first portion.

The Applicant has demonstrated that, in the sensor according to the present description, the two wire-based at least partially the conductive elements crossing calorimetric element allow performing at a given time point a measurement of an average temperature of the calorimetric element, wherein said average temperature is a temperature averaged over the portion of the calorimetric element that is crossed by said two wire-based conductive elements. This increases the accuracy of the measurement of the temperature of the calorimetric element in comparison with the inertial heat flux sensors of the prior art.

Thus, the arrangement crossing the wire-based elements of the sensor according to the present description advantageously allows, for example, overcoming the temperature measurement uncertainties of the calorimeter resulting from the existence of a temperature gradient between different areas of said portion of the calorimetric element crossed by the two wire-based conductive elements.

In particular, the sensor according to the first aspect solves some of the drawbacks of the inertial heat flux sensors of the prior art, in particular of inertial heat flux sensors with a thermocouple at the rear face, wherein thermocouple enables a measurement of the temperature of the calorimetric element only at one point of the calorimetric element on the rear face and wherein the assumption of a thin calorimetric element is therefore met only with calorimetric elements with a small thickness, which limits the use for high heat fluxes.

According to one or more example(s), a length of the calorimetric element, defined in a direction substantially orthogonal to the front face, is strictly longer than 0, 1 mm, advantageously longer than or equal to about 1 mm, advantageously longer than or equal to about 2 mm. In general, the length may be selected long enough to have good resistance to heating when the sensor is subjected to high heat fluxes, and small enough to meet the assumption of a thermally-thin calorimetric element.

According to one or more example(s), said two wire-based conductive elements cross the calorimetric element over at least about 30% of the length of the calorimetric element, preferably 50%, even more preferably 90%.

According to one or more example(s), said two wire-based conductive elements cross the entirety of the calorimetric element so as to be flush with the first portion of the calorimetric element exposed to the heat flux.

According to one or several examples, said two wire-based conductive elements are arranged substantially parallel.

According to one or several examples, said calorimetric element has a cylindrical shape, a conical shape or a cylindrical-conical shape and comprises an axis of revolution, said axis of revolution being substantially normal to said first portion.

According to one or several examples, said two wire-based conductive elements are arranged substantially parallel to said axis of revolution and symmetrically with respect to said axis of revolution.

According to more example(s), said one or calorimetric element comprises a material having:
- a constant-pressure thermal capacity higher than or equal to about 120 J/(kg·K) at 25° C.; and/or
- a melting temperature higher than or equal to about 500° C.; and/or
- a density higher than or equal to about 2,500 kg/m$^3$.

According to one or more example(s), said calorimetric element comprises graphite, a metal, or a metal alloy, preferably copper or silver.

According to one or more example(s), said two different thermoelectric materials are a pair of materials selected from among chromel/constantan, iron/constantan, chromel/alumel, nicrosil/nisil, nickel-molybdenum alloy/nickel-cobalt alloy (nickel-molybdenum/nickel-cobalt), platinum-rhodium/platinum (platinum-rhodium/platinum) alloy, tungsten-rhenium/tungsten (tungsten-rhenium/tungsten) alloy.

According to one or several examples, the sensor further comprises a bonding material embedding each of the two wire-based conductive elements to ensure a mechanical contact between each of said two wire-based conductive elements and said calorimetric element.

According to one or more example(s), said bonding material comprises:
- an electrical conductivity higher than or equal to about 10$^6$ S/m; and/or
- a thermal conductivity higher than or equal to about 200 W/(m·K).

According to one or several examples, said bonding material comprises a material selected from among at least one of the following materials: silver, gold, copper and phosphorus alloy, copper and silver alloy, copper and zinc alloy.

According to one or more example(s), the thermal insulation element comprises a thermal conductivity lower than or equal to about 2 W/(m·K), preferably lower than or equal to about 0.5 W/(m·K).

According to one or more example(s), the thermal insulation element is in particular a solid selected preferably from among aerogels, porous ceramics, refractory cements, cement-ceramic composites, epoxy resins, phenolic resins, ceramic-ceramic composites and technical cork.

According to one or more example(s), the sensor further comprises a heat exchanger in contact with a portion of the calorimetric element, said heat exchanger being configured to cool the calorimetric element.

In such a configuration, a portion of the heat flux stored by the calorimetric element is dissipated by the heat exchanger, so that it is possible to expose the calorimetric element to a high heat flux, for example higher than or equal to a few W/m$^2$, without the melting temperature of the calorimetric element being reached. Hence, this allows measuring a high heat flux without any time constraint, the melting point of the material forming the calorimetric element never being reached.

According to one or more example(s), the first portion is at least partially covered with a reflective film comprising an emissivity lower than or equal to about 0.1, preferably lower than or equal to about 0.05, within a wavelength range comprised between about 0.5 micrometres and about 10 micrometres According to one or more example(s), the first portion is covered at least partially with a reflective film comprising an emissivity lower than or equal to about 0.1, preferably lower than or equal to about 0.05, within a wavelength range comprised between about 0.8 and about 3 micrometres.

According to one or more example(s), said front face is covered at least partially with an absorbent film comprising an emissivity higher than or equal to 0.9, preferably higher than or equal to about 0.95, within a wavelength range comprised between about 0.5 micrometres and about 10 micrometres.

According to one or more example(s), said front face is covered at least partially with an absorbent film comprising an emissivity higher than or equal to 0.9, preferably higher than or equal to about 0.95, within a wavelength range comprised between about 0.8 and about 3 micrometres.

According to one or more example(s), the sensor further comprises a porthole configured to be arranged between the heat flux to be measured and said calorimetric element but not in mechanical contact with said absorbent film.

In such a configuration, the convective contribution of the heat flux to be measured is neutralised by the porthole, so that it is possible to use the sensor to measure only the radiative contribution of the heat flux.

According to one or more example(s), said porthole has a transmission higher than about 0.9, preferably 0.95, within a wavelength range comprised between about 0.8 and about 3 micrometres.

According to one or more preferred example(s), said porthole has a transmission higher than about 0.9, preferably 0.95, within a wavelength range comprised between about 0.5 micrometres and about 10 micrometres.

This allows having a good transmission of the radiative flux from the environment outside the sensor towards the front face of the calorimetric element.

According to a second aspect, the present description relates to an inertial heat flux measurement system comprising:
- a sensor according to the first aspect;
- means for measuring a potential difference between the two wire-based conductive elements when the first portion of the calorimetric element is exposed to a heat flux to be measured; and
- a processing unit configured to calculate, from said potential difference, a value of said heat flux.

According to a third aspect, the present description relates to a method for measuring a heat flux by means of a system according to the second aspect:
- exposing the first portion of the calorimetric element of the sensor to the heat flux to be measured;
- measuring a potential difference between the two wire-based conductive elements of the sensor with the potential difference measuring means; and
- calculating, from the potential difference, a value of the heat flux using the processing unit.

BRIEF DESCRIPTION OF THE FIGURES

Other advantages and features of the invention will become apparent upon reading the description, illustrated by the following figures.

DETAILED DESCRIPTION OF THE INVENTION

In the figures, the elements are not always plotted to the scale for better visibility.

Figure 2:
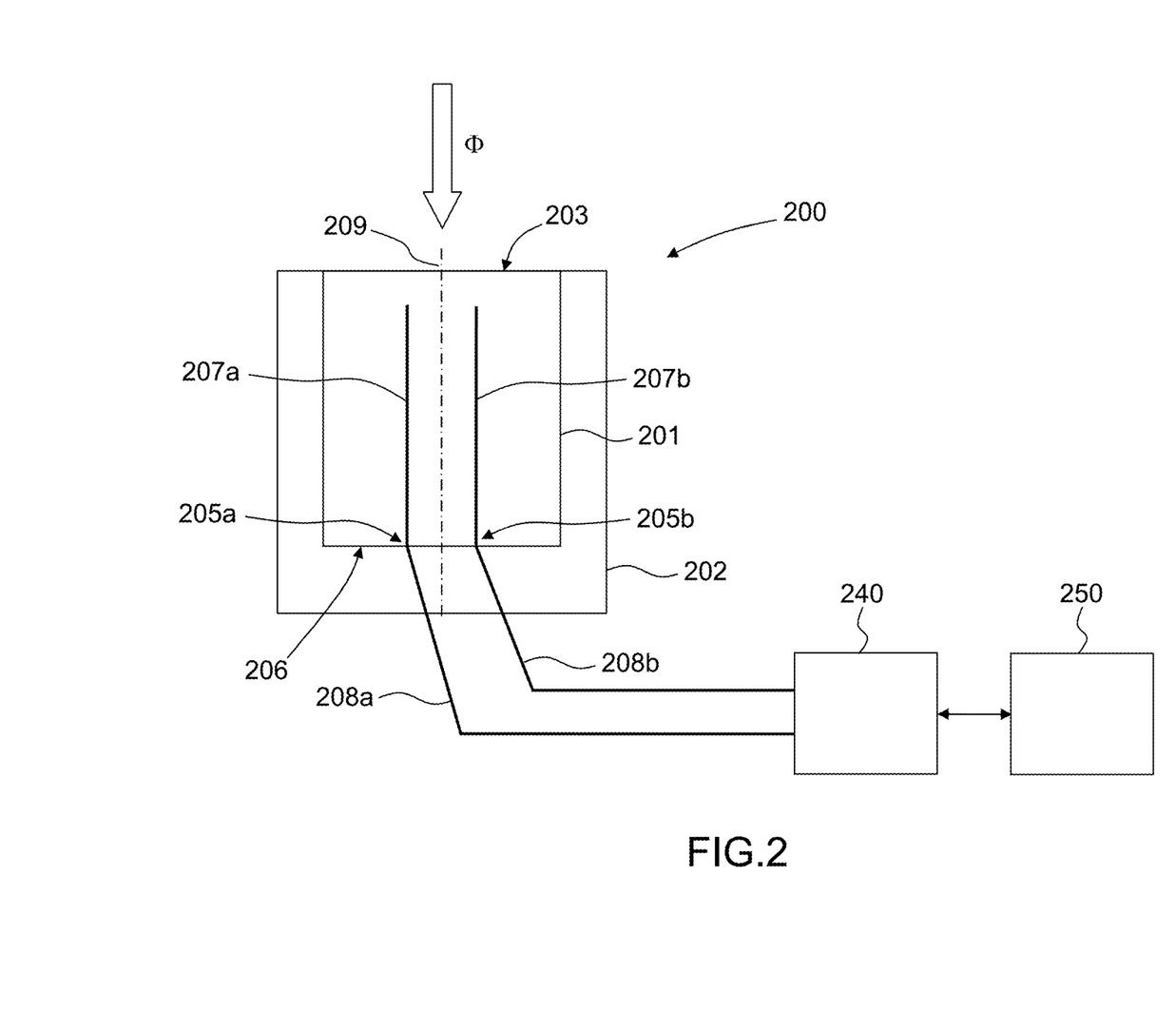
FIG. 2 shows a diagram illustrating a heat flux measurement system comprising an example of a sensor according to the present description.

FIG. 2 shows a sectional view of an example of an inertial heat flux measurement system comprising a sensor 200 exposed to a heat flux, means 240 for measuring a potential difference (also called measuring unit 240), and a processing unit 250.

In particular, the sensor 200 comprises a calorimetric element 201 having a front face 203 and a rear face 206 opposite to the front face 203, a thermal insulation element 202, two wire-based elements 207a, 207b crossing the calorimetric element 201 from the rear face 206. The sensor 200 is electrically connected to the measuring means 240 by the wire-based elements 207a, 207b and, possibly, via two connection elements 208a, 208b respectively electrically connected to the wire-based elements 207a, 207b.

As will be described in more detail hereinafter, when the sensor 200 is subjected to a heat flux, the sensor 200 produces, by Seebeck effect, a potential difference which is measured by the potential difference measuring means 240. Said potential difference is then transmitted to the processing unit 250 which calculates a heat flux value.

In general, the potential difference measuring means 240 may comprise a voltmeter and a unit for shaping the electrical signal measured by the voltmeter, said shaping unit comprising, for example, a voltage amplifier.

In the present description, the processing unit 250 may be a computer comprising a memory for storing instructions and a processor capable of executing the instructions stored in the memory, in particular so as to control the calculation of a heat flux value from a potential difference received from the potential difference measuring means 240. The processing unit 250 may also be in the form of an integrated circuit comprising electronic components adapted to the implementation of a function described in the present description. The processing unit 250 may also be implemented by one or more physically distinct device(s).

In the heat flux sensor 200, the calorimetric element 201 is partially wrapped by the insulation element 202. Thus, the insulation element 202 allows defining a first portion not covered with the calorimetric element 201 configured to be exposed to the heat flux to be measured and forming part of said front face 203, and a second portion of the calorimetric element 201 thermally insulated from said heat flux. Said first portion not covered with the calorimetric element 201 is substantially planar.

In the example illustrated in FIG. 2, the first portion of the calorimetric element configured to be exposed to the heat flux is coincident with the front face 203. In other examples, not shown, the front face 203 comprises the first portion of the calorimetric element but is not coincident with said first portion.

In this example, the calorimetric element 201 comprises an axis of revolution 209 and is a right circular cylinder, one of the bases of which is the front face 203 and the other base is the rear face 206.

The sensor 200 also comprises two wire-based conductive elements 207a, 207b made of two different thermoelectric materials and which partially cross the calorimetric element 201 from the rear face 206 in the direction of the length of the calorimetric element 201. As will be explained in detail hereinafter, the Applicant has demonstrated that the two wire-based conductive elements 207a, 207b measuring the average allow temperature of the calorimetric element 201.

In the inertial heat flux measurement system according to the present description, the Applicant has demonstrated that the heat flux $\phi$ to be measured could be obtained from the temperature variation obtained thanks to the variation of potential difference measured between the two wire-based conductive elements 207a, 207b, via the formula in the next paragraph.

$$\phi(t) = \frac{m}{S} \cdot C_p(T) \cdot \frac{dT}{dt} \qquad \text{[Math 1]}$$

In said formula, m is the mass of the calorimetric element 201 of the sensor, S the section of the first portion exposed to the heat flux, Cp is the constant-pressure heat capacity of the constituent material of said calorimetric element 201, T the temperature of the calorimetric element 201, and t is time, i.e. the time point at which the temperature measurement is performed. Typically, a user acquires a series of temperature measurements (T1, T2, ..., Tn) at regular time intervals (t, t+$\Delta$t, ..., t+n·$\Delta$t). Afterwards, the discrete derivative of this time series is calculated to obtain an experimental value of the heat flux via the previous equation.

The evolution made to the technology of inertial heat flux measurement systems by the Applicant is primarily based on the possibility of carrying out a through-temperature measurement in the calorimetric element 201, while it has previously been possible only on the rear face 206. Secondly, the evolution is based on the use of a thermocouple formed by two elements (207a, 207b) disjoint but electrically connected by the calorimetric element 201, instead of a thermocouple 107 (illustrated in FIG. 1), the two elements (107a, 107b) of which are joined at one single hot junction 104 affixed at a point of the calorimetric element 101. The combination of these two aspects allows significantly improving the accuracy of the temperature measurement of the calorimetric element and therefore of the heat flux value which is derived therefrom.

In the sensor according to the present description, the two wire-based conductive elements 207a, 207b are arranged substantially parallel to the axis of revolution 209 of the calorimetric element 201. The two wire-based conductive elements 207a, 207b partially cross the calorimetric element 201 from the rear face 206 in a direction substantially orthogonal to the front face 203 which is also the direction in which the length of the calorimetric element 201 is defined. In preferred examples, the two wire-based conductive elements 207a, 207b cross at least the calorimetric element 201 over about 90% of the length of the calorimetric element 201.

In the example of FIG. 2, the two wire-based elements 207a, 207b are arranged parallel to one another and symmetrically with respect to the axis of revolution 209. The two wire-based elements 207a, 207b run from the rear face 206 of the calorimetric element 201 through two orifices 205a, 205b, respectively.

According to some examples, the two wire-based elements 207a, 207b are connected to the potential difference measuring means 240 by connection elements 208a, 208b. The connection elements 208a, 208b may be portions of the two wire-based elements 207a, 207b which extend so as to connect the means 240 for measuring the potential difference.

As illustrated in the example of FIG. 2, the connection elements 208a, 208b may cross the insulation element 202 in order to connect the two wire-based elements 207a, 207b to the potential difference measuring means 240.

Although one single pair of wire-based elements 207a, 207b is shown in FIG. 2, some examples of a sensor according to the present description may comprise several pairs of wire-based elements 207a, 207b inserted into the calorimetric element.

In some embodiments, the wire-based elements 207a, 207b are single-strands with a diameter smaller than about 1 mm, for example with a diameter equal to about 0.5 mm.

According to some examples, the wire-based elements 207a, 207b are inserted into the calorimetric element 201 by means of micro-holes formed along the length of the calorimetric element 201. For example, if the wire-based elements 207a, 207b are single-strands with a diameter equal to about 0.5 mm, the micro-holes may have a diameter of 0.55 mm, thereby offering a slight clearance to enable the insertion of the wire-based elements 207a, 207b into the calorimetric element 201.

For example, the micro-holes may be made by electrical-discharge machining. The holes may be diametrically opposite with respect to the revolution 209 of the calorimetric element 201. For example, the micro-holes may be arranged over a circle with a diameter equal to about 1.5 mm which is concentric with the diameter of the calorimetric element 201 and cross the calorimetric element 201 longitudinally. Thus, the holes are parallel to one another over the entire path thereof.

The two wire-based elements 207a, 207b are formed of two different thermoelectric materials. In this manner, the Applicant has demonstrated that the arrangement of the 207a, two wire-based elements 207b crossing the calorimetric element 201 then forms a thermocouple for measuring the temperature of the calorimetric element. The two thermoelectric materials used in the sensor 200 may vary but are preferably selected from among the pairs of materials generally used in K-type, J-type, E-type or N-type thermocouples.

Thus, in the case of a K-type thermocouple, one of the materials of the two wire-based elements 207a, 207b is a nickel-chromium alloy (chromel) while the other material is a nickel-aluminium alloy (alumel). The selected two materials may also be a pair of materials generally used to form other types of thermocouples, for example B-type, R-type, S-type, T-type, G-type, C-type, D-type thermocouples.

Preferably, the insulation element 202 is a ceramic. In particular, it may consist of a porous insulating ceramic based on alumina ($Al_2O_3$) prepared in liquid form and injected between the calorimetric element and its support (not illustrated in FIG. 2). During making of such a ceramic, particular attention is given to the absence of trapped air which might create cavities within the insulation element 202. Where necessary, according to some examples, the process of manufacturing the ceramic may comprise, before curing, degassing under a vacuum bell. Once the ceramic is hardened, a supplement of fresh ceramic may be performed to compensate for any shrinkage at the front face of the sensor. Once cured, the ceramic may be fine grain (for example 240 type grain) polished to be perfectly aligned with the front face 203 of the calorimetric element 201.

According to one or more example(s), the insulation element 202 is assembled with the calorimetric element 201 by casting in a place in support comprising the calorimetric element 201, by pressure injection, by machining and fitted insertion in said support, by sintering in place, by in situ manufacturing by an additive method or by any other process known to a person skilled in the art.

The calorimetric element 201 comprises a material whose thermal properties (for example the thermal conductivity and the constant-pressure thermal capacity) are known and may be expressed by equations dependent on the temperature of the calorimetric element 201. According to a preferred example, the calorimetric element 201 is made of copper.

In the example illustrated in FIG. 2, the calorimetric element 201 is a right circular cylinder characterised by the axis of revolution 209. Hence, the cross-section of the calorimetric element 201 looks rectangular in the sectional view of FIG. 2 and the front face 203 is illustrated by a rectilinear edge because it consists of a planar surface.

Figure 3:
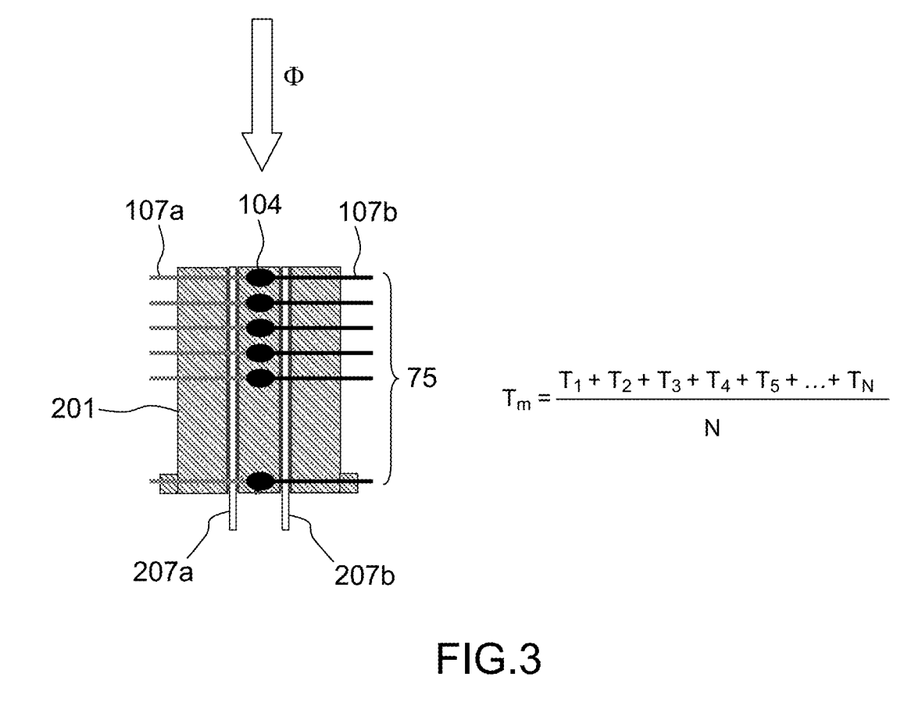
FIG. 3 shows a diagram illustrating the operation of a sensor for an inertial heat flux measurement system according to the present description.

According to other examples, the calorimetric element 201 may be a truncated cone whose base serves as a rear face 206 and whose side opposite to the base serves as a front face 203 or a shouldered cylinder at the front face so as to have a front face 203 with a smaller surface area than the average section of the cylinder. These two alternative geometries allow extending the measurement time without changing the material forming the calorimetric element 201. FIG. 3 shows a schematic diagram of a sensor for an inertial heat flux measurement system according to the present description comprising a calorimetric element 201 crossed by two elements 207a, 207b of a thermocouple.

Because of the through measurement and the disjoint elements 207a, 207b of the thermocouple, the potential difference due to the Seebeck effect appearing between the elements 207a, 207b corresponds to the average temperature Tm of the calorimetric element 201 over the crossed length. Hence, such an arrangement behaves as if a multitude 75 of thermocouples (107a, 107b) with one single junction 104 were distributed over the length of the calorimetric element 201, thereby generating an exact average of the temperature of the calorimetric element 201 over the length. By exact average, it should be understood that the obtained temperature is a continuous average of the temperatures over the entire length crossed by the calorimetric element 201 and not a discrete average, as schematically illustrated in FIG. 3 for explanation.

Consequently, the sensor for a heat flux system according to the present description allows measuring the temperature of the calorimetric element 201 at several points distributed along the length of the calorimetric element 201, which makes it possible, for example, to take account of a temperature gradient within the calorimetric element 201. For example, such gradients are due to a high heat flux over the front face 203 of the calorimetric element 201 causing temperature inhomogeneities within the calorimetric element 201.

By contrast, the fluxmeters according to the prior art have the major drawback of measuring the temperature of the calorimetric element only at one single point, and therefore cannot take account of a possible temperature gradient in the calorimetric element, which reduces the accuracy of such fluxmeters.

Sizing of the Calorimetric Element

In preferred embodiments, the calorimetric element 201 is sized so as to meet at least two generally antagonistic criteria, set out hereinafter.

Assumption of the Thermally-Thin Medium

On the one hand, the calorimetric element 201 may be sized such that its temperature is almost uniform when it is subjected to a heat flux, which allows considering it to be "thermally thin" and, therefore, being able to use the thermodynamics theory to calculate a value of the heat flux from the potential difference due to the rise in temperature of the calorimetric element 201. In practice, this first criterion results in a maximum length for the calorimetric element beyond which the calorimetric element can no longer be considered to be thermally thin. The Applicant has demonstrated that it is possible to determine said maximum length of the calorimetric element 201 using a dimensionless number comprising parameters of the sensor and experimental conditions of the heat flux measurement. In particular, the Applicant has demonstrated that, when the dimensionless number to be taken into account is less than about 0.1, then the calorimetric element 201 may be considered to be a thermally-thin medium.

The dimensionless number to be taken into account depends on the type of heat flux to be measured by the sensor.

In the case where the heat flux to be measured is a substantially convective flow, the dimensionless number to be taken into account is the Biot number.

The Biot number is defined by the formula in the next paragraph.

$$Bi = \frac{h \cdot H}{\lambda} \quad \text{[Math 2]}$$

In the previous formula, h is a convection coefficient under the measurement conditions, H the length of the calorimetric element 201, and X the thermal conductivity of the material forming the calorimetric element 201.

In the case where the heat flux to be measured is a substantially radiative flux, the dimensionless number to take into account is the radiation number, $N_R$.

The radiation number is defined by the formula in the next paragraph.

$$N_R = \frac{\sigma \cdot T_{gas}^4 \cdot H}{\lambda \cdot (T_{gas} - T_{ini})} \quad \text{[Math 3]}$$

In the previous formula, G is the Stefan-Boltzmann constant, $T_{gas}$ is the temperature of the environment outside the sensor, H is the length of the calorimetric element, X is the thermal conductivity of the material forming the calorimetric element 201 and Tini is the initial temperature (before measurement) of the calorimetric element 201.

In the case where the heat flux is a flux so-called "total flux" comprising both a radiative contribution and a convective contribution, the dimensionless number to be taken into account is the sum of the Biot number and the radiation number.

Resistance of the Material to Meltdown

On the other hand, in order to guard against any irreversible degradation of the calorimetric element 201, one could seek for the temperature reached at the end of measurement of the heat flux not to exceed the melting temperature of the calorimetric element 201. In practice, this second criterion results in a minimum length for the calorimetric element 201 for a given material, below which the calorimetric element might melt down during the heat flux measurement.

The Applicant has demonstrated that the minimum length of the calorimetric element may be determined from an energy balance involving physical parameters of the calorimetric element and parameters of the heat flux measurement, said parameters comprising in particular:

- the constant-pressure thermal capacity of the calorimetric element and the dependence of this thermal capacity with the temperature, i.e. the function $C_p(T)$;
- the mass of the calorimetric element (m), which depends in particular on the density (ρ) of the calorimetric element and on the volume of the calorimetric element;
- the initial temperature, $T_{ini}$, of the calorimetric element, i.e. before the measurement, for example 20° C. for a conventional ambient temperature;
- the acceptable final temperature, Tend, of the calorimetric element, i.e. a temperature strictly lower than the melting temperature of the calorimetric element. In particular, it is possible to define a safety thermal margin, for example about 10%, in order to ensure a final temperature lower than about 90% of the melting temperature of the calorimetric element and thus ensure robustness of the sensor.
- the average maximum flux, $\phi_{average}$, to be measured by the sensor, this consists for example of a flux in the range of 8 MW/m²; and
- the maximum measurement duration, Δt, i.e. the maximum time during which the sensor will be exposed to the heat flux to measure the heat flux.

The Applicant has proven that said heat balance gives, in particular in the case of a calorimetric element that is a right circular cylinder, a minimum length of the calorimetric element expressed according to the formula in the next paragraph.

$$H_{min} = \frac{\phi_{average} \cdot \Delta t}{\rho \cdot C_{p,av} \cdot (T_{end} - T_{ini})} \quad \text{[Math 4]}$$

In the previous formula, $C_{p,av}$ is an integral average of the constant-pressure thermal capacity of the calorimetric element having as a lower limit the initial temperature, $T_{ini}$, of the calorimetric element and as a final limit the final temperature, $T_{end}$, Of the calorimetric element. The Applicant has observed that other types of averages (for example the half-sum of the thermal capacities at the final temperature and at the initial temperature) could be used but that the integral average is particularly advantageous because of the simplicity of calculation thereof.

For example, when the sensor is sized so as to measure a substantially convective heat flux equal to about 8 MW/m² originating from a gas source at 2,500° C. for a duration at least equal to about 5 seconds, with an initial ambient temperature of about 20° C., and that the calorimetric element is a right circular cylindrical made of copper with a density equal to about 8, 920 kg/m³ (CuC2 grade pure copper), then it is acceptable for the cylinder to have a length comprised between about 10.9 mm and about 11.5 mm so that, on the one hand, the Biot number is substantially less than or equal to 0.1 and that, on the other hand, the reached final temperature does not exceed the melting temperature of the calorimetric element 201, with a safety margin of 10%.

Sizing of the Front Face

In the equation [Math 4], the surface of the first portion not covered by the insulating element, which may in some examples be coincident with the front face 203 of the calorimetric element, does not appear. Thus, in the case of a calorimetric element 201 which is a right circular cylinder, sizing of the surface of the front face 203 of the calorimetric element 201 may in principle be selected arbitrarily. However, some constraints may be taken into account to select this value, including for example:

- the space requirement of the sensor with regards to the environment of the specifically studied sensor. In particular, it is possible to reduce the surface of the front face 203 to facilitate the implantation of the sensor;
- the manufacturing and handling constraint. In particular, a surface of the front face 203 that is too small could make the manufacturing of the sensor more difficult, (in particular because of a less easy gripping);
- the heat losses minimisation constraint. In particular, the total external surface of the calorimetric element 201 induces thermal losses which may generally be reduced if the surface of the front face 203 is reduced. For example, in the case of a right circular cylinder, the larger the diameter of the cylinder, the larger the surface of revolution of the cylinder and the larger the lateral thermal losses will be, which is detrimental to the accuracy of the measurement, because said losses are difficult to measure.

Moreover, sizing of the surface of the front face 203 may also meet particular experimental conditions, for example increasing the duration of measurement of a heat flux without any desire to change the material of the calorimetric element 201. Thus, according to some examples, the calorimetric element 201 may comprise a shoulder, the end of which forms the front face 203, so as to reduce the surface area of the front face 203 relative to the dimensions of the calorimetric element 201 and thus to be able to avoid an excessively rapid meltdown of the calorimetric element 201. For example, in the case of a calorimetric element 201 that is a right circular cylinder, it is possible to reduce, by a shoulder, the surface of the front face 203 by a 2 factor with respect to the surface of the cylinder in order to be able to extend the duration of measurement of the heat flux by a 4 factor yet without affecting the condition of thermally-thin medium.

Figure 4:
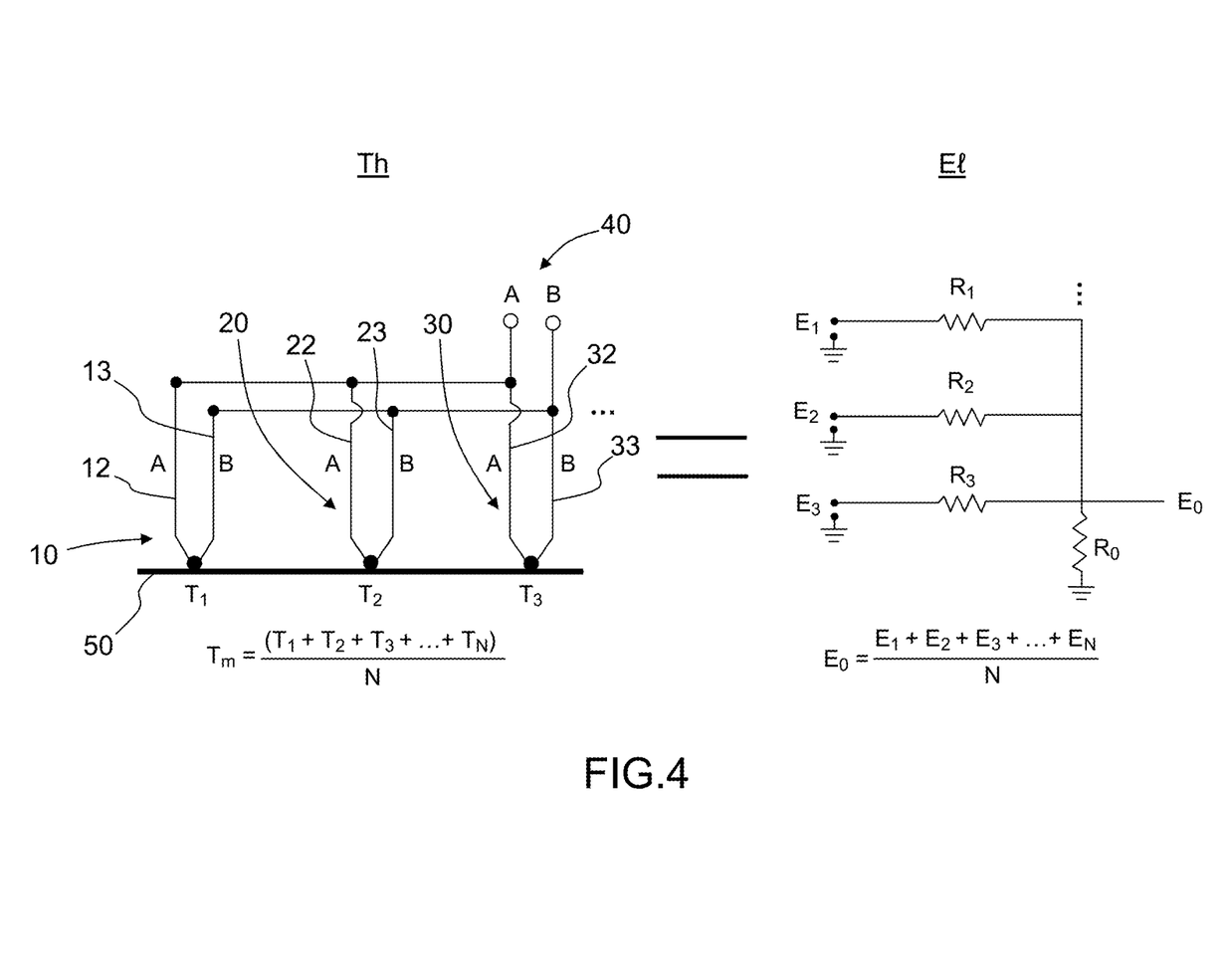
FIG. 4 shows a diagram illustrating a principle of measuring an average temperature of a calorimetric element in a sensor according to the present description, by means of an equivalent diagram.

FIG. 4 illustrates the principle of the through measurement by a thermoelectric analogy between a thermal circuit (Th) comprising thermocouples as illustrated in the equivalent diagram of FIG. 3 and an electrical circuit (E1).

In FIG. 4, the longitudinal average temperature of a rectilinear calorimetric element 50 is measured by means of three thermocouples 10, 20, 30 each consisting of two elements (12, 13, 22, 23, 32, 33). The Applicant has demonstrated that, if the thermocouples are connected as shown in FIG. 4, then the potential difference measured between the wires A and B of the ends 40 allows deducing the average longitudinal temperature, Tm, corresponding to the average of the temperatures (T1, T2, T3) which would be respectively measured with the thermocouples 10, 20, 30. This could demonstrated in particular by thermoelectric analogy between the thermal circuit, Th, and the equivalent electrical circuit, E1. Hence, the through measurement allows measuring the average longitudinal temperature, Tm, of the calorimetric element by measuring the temperature at several levels in the calorimetric element.

Figure 5A:
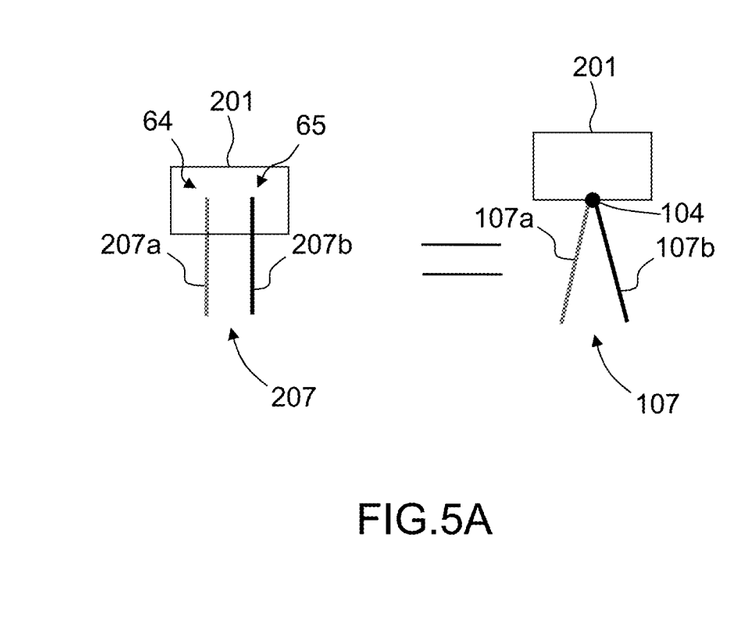
FIG. 5A shows a diagram illustrating a thermocouple according to the prior art and a portion of a sensor according to the present description.

FIG. 5A illustrates a thermocouple 107 with one single hot junction 104 according to the prior art and a thermocouple 207 formed by the wire-based elements (207a, 207b) of the sensor according to the present description.

The Applicant has demonstrated that it is possible to measure the temperature of a calorimetric element 201 by means of a thermocouple 207 with a particular arrangement wherein the two elements 207a, 207b are not directly connected mechanically by one single hot junction but are connected via the calorimetric element 201. Hence, this particular arrangement comprises two hot junctions 64, 65 because there is a junction between the calorimetric element 201 and each of the two elements 207a, 207b of the thermocouple 207.

In order to be able to measure a temperature of the calorimetric element 201 by means of such an arrangement, it is useful for the calorimetric element 201 to conduct enough electricity. To this end, the Applicant has observed that a calorimetric element having an electrical conductivity higher than or equal to about $10^5$ S/m, preferably $10^7$ S/m is satisfactory to be able to measure the temperature of the calorimetric element 201.

The Applicant has demonstrated that such an arrangement is equivalent to the arrangement generally used in the prior art wherein the two elements, 107a, 107b are directly connected at one single junction 104 which is placed in contact with a point of the calorimetric element 201 at which the temperature is measured. Said equivalence is due to the compensation of the contributions of the calorimetric element to the Seebeck effects of the two junctions 64, 65. In particular, because of the opposite sign of the Seebeck coefficients of the two junctions 64, 65.

Figure 5B:
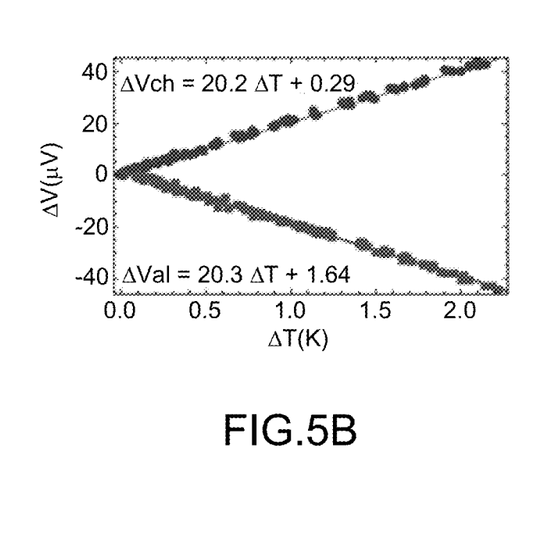
FIG. 5B shows a graph illustrating the evolution of the potential differences generated by thermocouples with opposite Seebeck coefficients as a function of temperature.

FIG. 5B shows a graph comprising experimental data showing an example of evolution of the potential difference appearing via the Seebeck effect for each of the two junctions 64, 65, as a function of a rise in the temperature of the calorimetric element 201. The data correspond to a case wherein the calorimetric element 201 is made of copper and where the two elements 207a, 207b are chromel and F alumel, respectively. In particular, FIG. 5B shows that the potential differences appearing at each junction 64, 65 are opposite and substantially equal in absolute value so that they almost totally compensate for one another.

Figure 6:
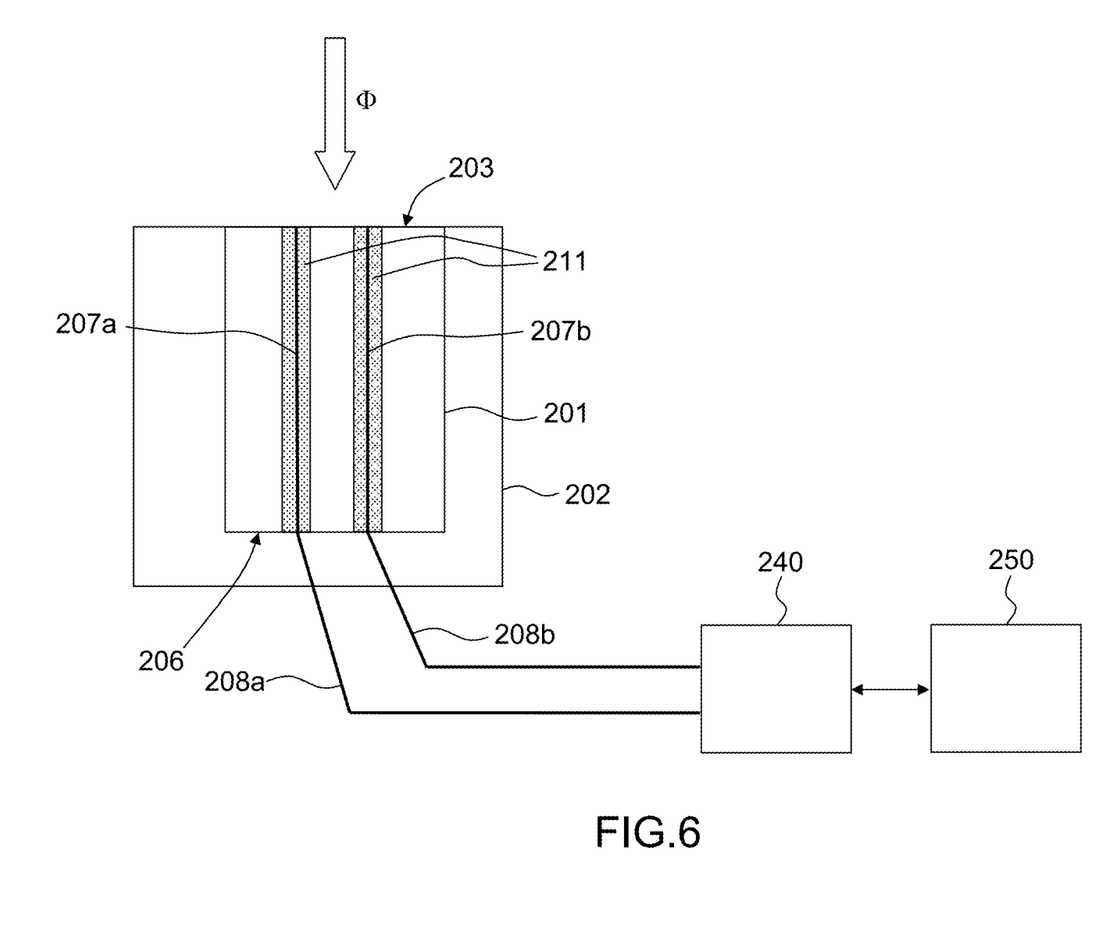
FIG. 6 shows a diagram illustrating an inertial heat flux measurement system comprising a second example of a sensor according to the present description.

FIG. 6 shows an example of a sensor for an inertial heat flux measurement system according to the present description. In particular, as illustrated in this example, the two wire-based elements 207a, 207b may cross the entire length of the calorimetric element 201 so as to be flush with the front face 203 of the calorimetric element 201.

In addition, as illustrated in the example of a sensor shown in FIG. 6, each of the two wire-based elements 207a, 207b may be embedded with a bonding material 211 ensuring a mechanical contact between the two wire-based elements 207a, 207b and the calorimetric element 201.

Preferably, said bonding 211 has an material electrical conductivity higher than or equal to about $10^6$ S/m and/or a thermal conductivity higher than or equal to about 200 W/(m K), so as to ensure electrical and thermal contact between the wire-based elements 207a, 207b and the calorimetric element 201.

According to some examples, the wire-based elements 207a, 207b are implanted in the calorimetric element 201 by brazing so that the bonding material 211 function is ensured by the brazing paste, for example a paste comprising silver.

Before brazing, the brazing paste is generally injected into the micro-holes using a syringe provided with a needle. The presence of an excess of paste at the outlet of the channels is checked in order to ensure that the micro-holes are saturated with paste. The wire-based elements 207a, 207b (for example, one composed of chromel and the other of alumel) are inserted into the micro-holes by the rear face 206 of the calorimetric element 201, until it slightly protrudes from the front face 203. Afterwards, the brazing operation is carried out by heating the calorimetric element to red, for example using an "oxy-butane" type torch. During heating, the silver paste migrates by capillarity within the micro-holes and wets substantially uniformly both the calorimetric element 201 and the wire-based elements 207a, 207b. After cooling, the front face of the calorimetric element (exposed to the flux) is generally fine grain (for example P240 type grain) polished to obtain a very good reflectivity and also to cut off the ends of the wire-based elements 207a, 207b that might protrude from the surface of the front face 203.

Figure 7:
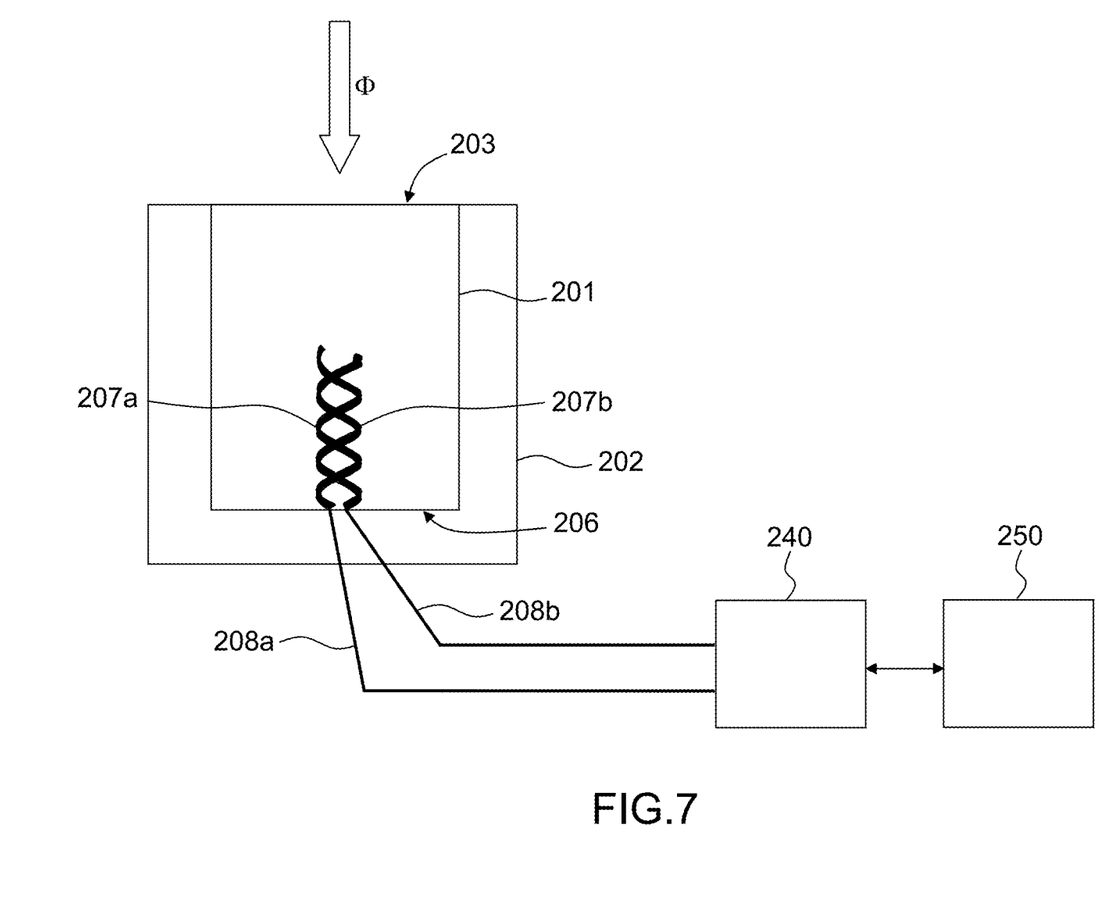
FIG. 7 shows a diagram illustrating an inertial heat flux measurement system comprising a third example of a sensor according to the present description.

The example illustrated in FIG. 7 shows that the wire-based elements may in some cases be parallel to one another while not being rectilinear. In particular, the two wire-based elements 207a, 207b may describe, in the manner of two deoxyribonucleic acid (DNA) strands, two mathematically conformal or substantially conformal helices.

Figure 8:
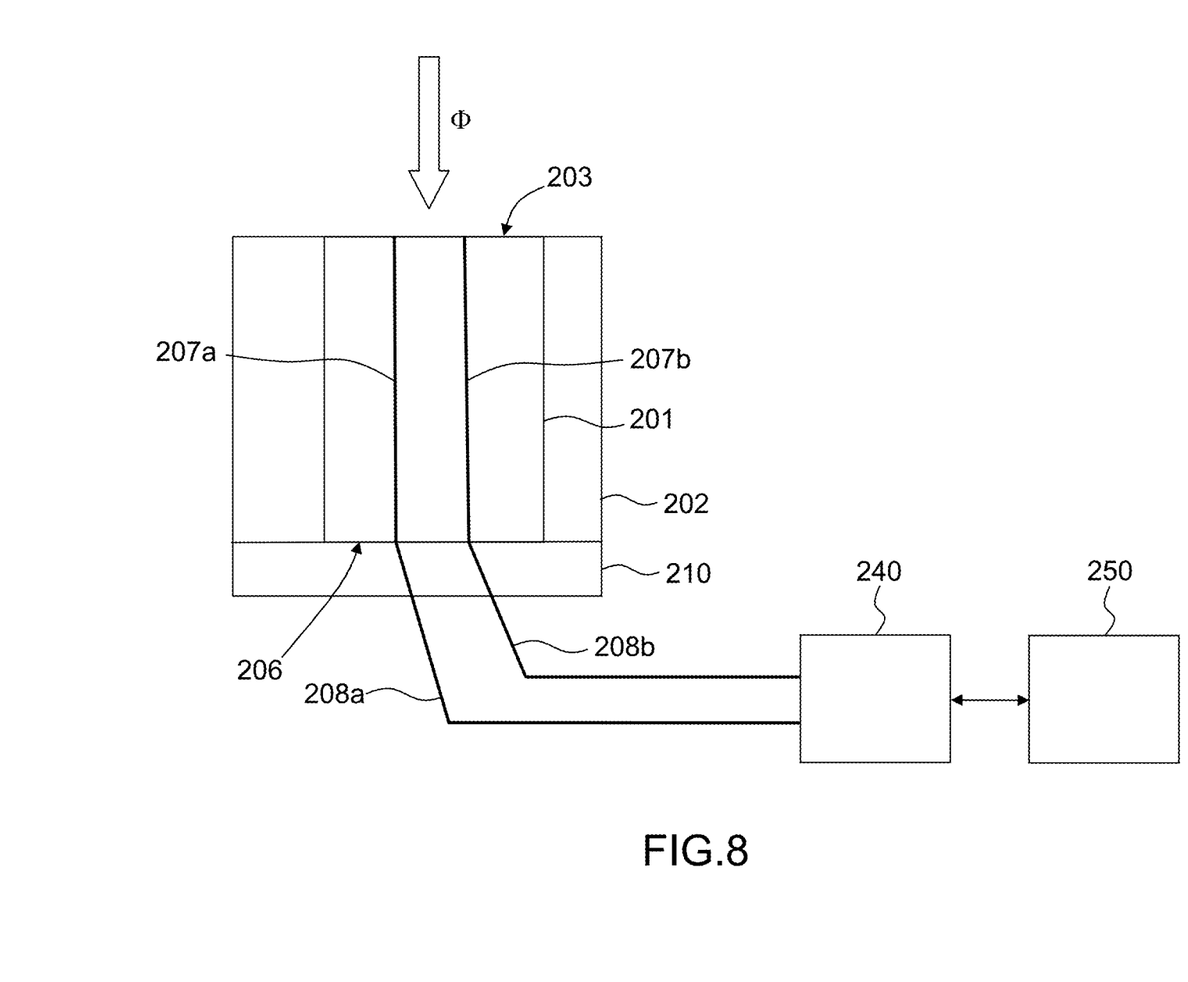
FIG. 8 shows a diagram illustrating an inertial heat flux measurement system comprising a fourth example of a sensor according to the present description, provided in particular with a heat exchanger.

In the example illustrated in FIG. 8, the sensor for an inertial heat flux measurement system comprises a heat exchanger 210 arranged in contact with at least one portion of the rear face 206 of the calorimetric element 201. The heat exchanger is configured to evacuate thermal energy in a controlled and predetermined manner from the calorimetric element 201. Thus, it is possible to extend a heat flux measurement for a long time without any risk of reaching a temperature in the calorimetric element 201 that exceeds the melting temperature.

In particular, according to some examples, the heat exchanger 210 is a liquid exchanger whose inlet temperature and mass flow rate are known and controlled, or measured during the operation of the sensor. The Applicant has demonstrated that it is possible, by measuring the outlet temperature of the exchanger, to determine the incident heat flux by carrying out an energy balance of the calorimetric element 201. In this case, as illustrated in FIG. 8, no thermal insulation element is generally applied over the rear face 206 of the calorimetric element 201, the rear face 206 should, on the contrary, evacuate the heat flux effectively.

In some examples, including the examples described before, the front face 203 may be covered with a coating configured to carry out different functions.

In particular, the coating may be an absorbent film configured to absorb the radiative contribution of the incident flux, and thus allowing ensuring the measurement of the total flux comprising the sum of the radiative and convective contributions to the heat flux. For example, such an absorbent film may be a high-temperature "matte black" colour paint having an average infrared absorptivity of 0.95 and an acceptable maximum temperature of 700° C. The latter is generally deposited manually by a round-tip precision brush over the front face 203 of the calorimetric element 201. On the other hand, the peripheral surface of the insulation element 202 should not be coated with paint.

The coating may also be a reflective film configured to reflect the radiative contribution of the incident flux, and thus facilitate the measurement of the convective contribution of the heat flux. For example, such a reflective film may be configured to confer on the front face 203 an emissivity lower than about 0.1, preferably lower than about 0.05.

According to some examples, not illustrated in the figures, the sensor may also comprise porthole configured to cancel the convective a contribution of the heat flux but to transmit the radiative contribution of the heat flux. Indeed, the porthole forms a mechanical barrier between the heat flux outside the sensor and the front face 203 of the calorimetric element 201 so as to prevent a movement of material related to said heat flux at the front face 203. When a sensor according to the present description is provided with such a porthole, it is possible to measure only the radiative contribution of the heat flux, because only this contribution reaches the front face 203, the convective contribution being cancelled by the porthole.

For example, such a porthole generally has a transmission higher than about 90% with regards to electromagnetic radiations having a wavelength comprised between about 0.7 micrometres and about 5 micrometres. Although portholes with a transmission higher than 90% are preferred, it is possible to use portholes with a transmission higher than 70%, all it needs then is to measure the transmission in the laboratory beforehand in order to be able to correct afterwards the heat flux measurements obtained in the presence of said porthole accordingly.

The porthole is arranged between the heat flux and the front face 203, but is not in contact with the front face 203 to avoid a transfer of thermal energy by conduction from the porthole towards the front face 203. For example, the porthole comprises sapphire. The shape of the porthole may be a circular plate with a thickness of about 0.5 to 1.5 mm.

In general, such a porthole is advantageously covered with an absorbent film as described before, in order to improve the measurement of the radiative contribution of the heat flux by the sensor.

Although described through some embodiments, the method and the sensors for an inertial heat flux measurement system according to the present description comprise different variants, modifications and improvements which will appear in an obvious manner to a person skilled in the art, it being understood that these different variants, modifications and improvements are within the scope of the invention as defined by the following claims.

REFERENCES

[Ref. 1] WO02/18890 A2, HEAT SENSING DEVICE FOR THERMAL AND SKIN BURN EVALUATION, Hamouda et al., published on Mar. 7, 2002

[Ref. 2] JAYAPRAKASH, C., KUMAR, P. Pratheesh, SRINIVAS, I, et al Development of copper slug calorimeter for heat flux measurements. In: Proc Asian Congr. Gas Turbines (ACGT). 2016. p. 1-6

[Ref. 3] FR 2 706 610

The invention claimed is:

1. A sensor for an inertial heat flux measurement system comprising:
    a solid calorimetric element with a given length, comprising a front face and a rear face opposite to the front face, said calorimetric element having a thermal conductivity higher than or equal to about 100 W/(m·K) and an electrical conductivity higher than or equal to about $10^5$ S/m;
    a thermal insulation element partially covering said calorimetric element so as to define a first portion that is not covered with the calorimetric element, is substantially planar, is configured to be exposed to a heat flux to be measured, and forms part of said front face, and a second portion covered with the calorimetric element and thermally insulated from said heat flux; and
    two wire-based conductive elements crossing said calorimetric element at least partially from the rear face and arranged so as not to be in mechanical contact with each other but to be in electrical contact via said calorimetric element over at least one portion of the length of the calorimetric element, the two wire-based conductive elements being made of two different thermoelectric materials.

2. The sensor according to claim 1, wherein said two wire-based conductive elements cross the calorimetric element over at least about 30% of the length of the calorimetric element.

3. The sensor according to claim 1, wherein said two wire-based conductive elements cross the calorimetric element therethroughout so as to be flush with said first portion.

4. The sensor according to claim 1, wherein said two wire-based conductive elements are arranged substantially parallel.

5. The sensor according to claim 1, wherein said calorimetric element comprises a material having:
    a constant-pressure thermal capacity higher than or equal to about 120 J/(kg·K) at 25° C.; and/or
    a melting temperature higher than or equal to about 500° C.; and/or
    a density higher than or equal to about 2,500 kg/m³.

6. The sensor according to claim 1, wherein said calorimetric element comprises graphite, a metal, or a metal alloy.

7. The sensor according to claim 1, wherein said two different thermoelectric materials are a pair of materials selected from among chromel/constantan, iron/constantan, chromel/alumel, nicrosil/nisil, nickel-molybdenum/nickel-cobalt, platinum-rhodium/platinum, and tungsten-rhenium/tungsten.

8. The sensor according to claim 1, further comprising a heat exchanger in contact with a portion of the calorimetric element, said heat exchanger being configured to cool the calorimetric element.

9. The sensor according to claim 1, wherein said first portion is at least partially covered with a reflective film comprising an emissivity lower than or equal to about 0.1 in a wavelength range comprised between about 0.5 micrometres and about 10 micrometres.

10. The sensor according to claim 1, wherein said calorimetric element has a cylindrical shape, a conical shape, or a cylindrical-conical shape and comprises an axis of revolution, said axis of revolution being substantially normal to said first portion.

11. The sensor according to claim 10, wherein said two wire-based conductive elements are arranged substantially parallel to said axis of revolution and symmetrically with respect to said axis of revolution.

12. The sensor according to claim 1, further comprising a bonding material embedding each of the two wire-based conductive elements to ensure a mechanical contact between each of said two wire-based conductive elements and said calorimetric element.

13. The sensor according to claim 12, wherein said bonding material comprises a material selected from among at least one of the following materials: silver, gold, copper and phosphorus alloy, copper and silver alloy, and copper and zinc alloy.

14. The sensor according to claim 1, wherein said first portion is at least partially covered with an absorbent film comprising an emissivity higher than or equal to about 0.9 in a wavelength range comprised between about 0.5 micrometres and about 10 micrometres.

15. The sensor according to claim 14, further comprising a porthole configured to be arranged between the heat flux to be measured and said calorimetric element but not in mechanical contact with said absorbent film.

16. An inertial heat flux measurement system comprising:
    a sensor according to claim 1;
    a measuring unit for measuring a potential difference between the two wire-based conductive elements when the first portion of the calorimetric element is exposed to a heat flux to be measured; and
    a processing unit configured to calculate, from said potential difference, a value of said heat flux.

17. A method for calculating a heat flux by means of a system according to claim 16 comprising:
    exposing the first portion of the calorimetric element of the sensor to the heat flux to be measured;
    measuring a potential difference between the two wire-based conductive elements of the sensor with the potential difference measuring unit; and
    calculating, from the, a value of the heat flux using the processing unit.

* * * * *